March 11, 1947.   L. B. RIVARD ET AL   2,417,324
FENDER CONSTRUCTION
Filed Sept. 17, 1945

Lawrence B. Rivard
Herman C. Kroepel
INVENTORS

Patented Mar. 11, 1947

2,417,324

UNITED STATES PATENT OFFICE 2,417,324

FENDER CONSTRUCTION

Lawrence B. Rivard, Dearborn, and Herman C. Kroepel, Detroit, Mich., assignors to Ford Motor Company, Dearborn, Mich., a corporation of Delaware Application September 17, 1945, Serial No. 616,804

5 Claims. (Cl. 296—28)

1

This invention pertains to automobile bodies; and, more particularly, to a means of constructing and supporting the rear fender of an automobile body when such fender is formed as an integral part of the body quarter panel and is pierced by a handhole to provide access to the gasoline tank filler pipe.

In the present art it is deemed desirable to eliminate the rear fenders as they have previously been known, and to form a wheel guard or wheel-housing by increasing the width of the automobile body and by extending the rear quarter panels of the body downwardly and in a slight outwardly direction so as to extend beyond the rear wheels. This construction smooths out the contours of the body and permits, to some extent, the enlargement of the interiors of the passenger and luggage compartments.

However, because of the use of a relatively thin sheet steel for the formation of the body panels, it has been found necessary to provide an inner wheelhousing and to strengthen that portion of the panel which forms the exterior of the fender by securing a second or interior panel to its inner surface in the nature of a liner. Various means of forming this liner are known and, in general, it can be said that it is secured to the body floor on the inner side of the wheel cavity, arches upwardly from that point to form the roof of the wheelhousing, descends downwardly to form the outer side of the wheelhousing and support for the exterior body panel and is secured to the lower edge of said body panel by welding or some similar means. This construction results in a hollow fender formed of two sheets of metal spaced apart, except where they are joined at their lower edges so as to create a wheelhousing entirely sealed from the passenger or luggage compartment of the body. It is obvious that this latter detail is particularly desirable and advantageous, because it prevents the seepage of water, mud, exhaust or gasoline fumes into the interior of the automobile from the underside of the vehicle.

However advantageous this fender construction may be, a definite problem is encountered when a double paneled fender is pierced for the placement of a handhole which will provide access to the gasoline tank filler pipe. It is readily admitted that a handhole of the type mentioned must be spacious and properly formed to allow the gasoline filler pipe to be easily reached and the pipe cover removed. Further, the breach through a double walled fender as is described here, must be adequately sealed to prevent the

2 seepage of moisture or raw gasoline into the cavity between the outer walls of the wheelhouse or the carrying of fumes up into the walls and interior of the body itself. Other requirements emanating from a piercing of the double wall include adequate reinforcement of the wall of the wheelhousing adjacent the hole to prevent vibration or collapse of the panels.

To the best knowledge of the applicants, these problems have not been, heretofore, adequately met, but compromise arrangements have been made whereby the gasoline filler pipe was extended into or through the luggage compartment of the automobile. In some instances, the filler pipe passed through the luggage compartment to allow the pipe cover to project from the extreme rear of the automobile body adjacent to the luggage compartment door. In other instances, the pipe was carried upwards through the luggage compartment floor and then passed outwardly through the rear quarter panel of the body at a point above the wheelhousing. In each of these, the filler pipe was brought within the automobile body proper, did not pierce the double walls of the wheelhouse and, passing through the luggage compartment, made possible the seepage of fumes or raw gasoline into that section.

It is the object of this invention, therefore, to provide a handhole through the double wall of an automobile wheelhousing formed as an integral part of the body, such that the hole is adequate in size but does not weaken the structure of the wheelhousing. It is a further object to construct the handhole so that the walls of the wheelhousing are joined at the point of breach so as to maintain a sealing of the wheel and gasoline tank section of the chassis away from the interior of the body.

A further object is to provide a means of fender construction which will permit the complete isolation of the gasoline tank and filler pipe thereof from the passenger or luggage compartments of the automobile, thereby preventing the seepage of fumes or raw gasoline with their accompanying hazards into those compartments.

With these and other objects in view, the invention consists in the arrangement, construction and combination of the various parts of our improved device, as described in the specification, claimed in the claims, and as illustrated in the accompanying drawings, in which:

Figure 1:
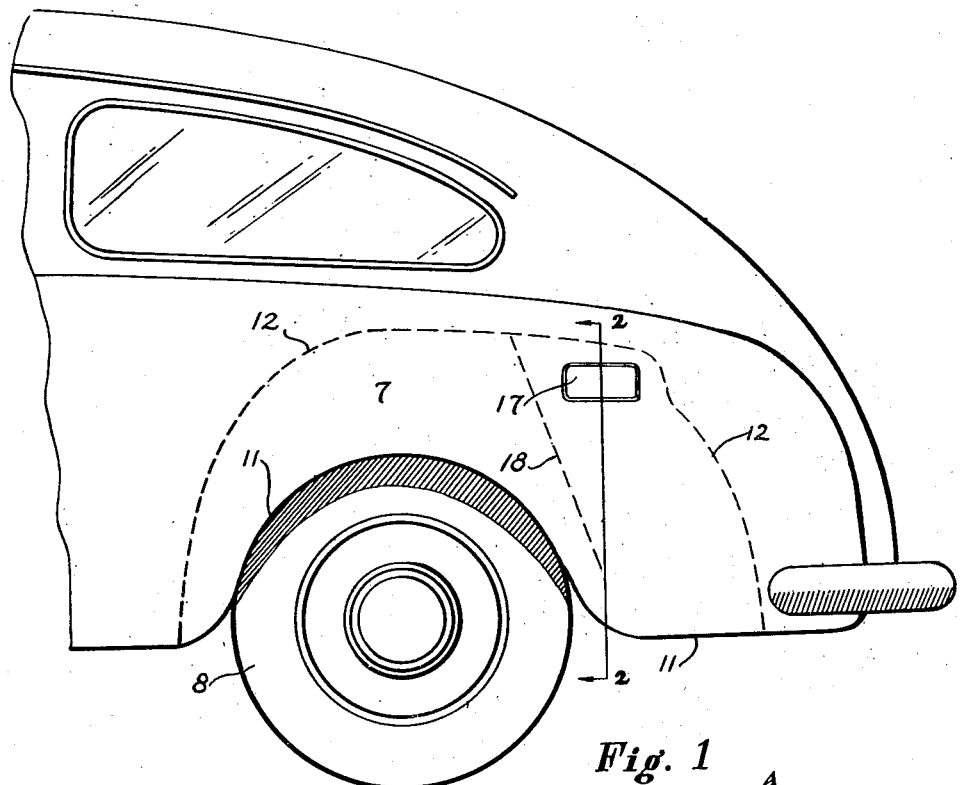
Figure 1 is a view of the left rear fender area of the conventional type automobile showing the location of the gasoline tank handhole and, in phantom, the jointure of the inner and outer wheelhousing panels.
Figure 2:
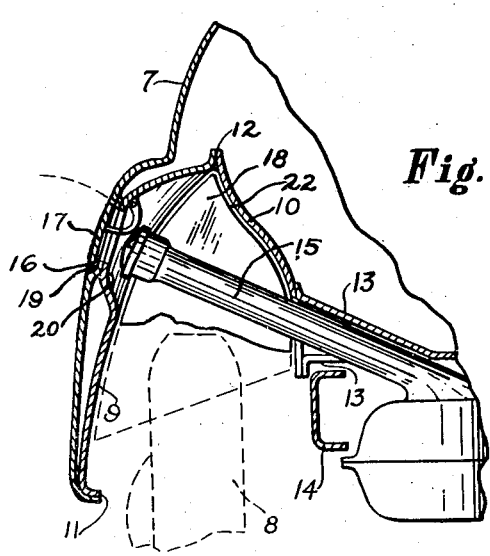
Figure 2 is a view of the wheelhousing construction taken substantially along line 2—2 of Figure 1.

Referring to Figure 2, the rear quarter body construction is comprised of three panels: the quarter panel 7 which, as an integral part of the body, extends outwardly and downwardly to form the outer wall or fender, the inner panel 9 which acts as a lining wall of the outer panel 7, and the panel 10 which forms the inner wall of the wheelhousing. As portrayed in the drawing, panel 7 conforms with and extends the contour of the rear quarter panel of the body and extends outwardly beyond the outer vertical surface of the wheel 8 and downwardly to a point below the uppermost peripheral point of the wheel 8. The lower edge of panel 7 is flanged and nests in a similar flange on the lower edge of liner 9 and is fastened thereto in a continuous seam by welding or some similar means along line 11. Panel 9 then extends upwardly inside of panel 7 and forms an arch above the upper periphery of the wheel 8, by joining with the upper edge of panel 10 in a welded or similarly formed seam along line 12. Panel 10 then extends downwardly and is fastened along its lower edge to the body flooring 13 which, in turn, is secured in conventional manner to frame 14. Seam 12, forming the jointure of panels 9 and 10 is represented by the dotted line 12 in Figure 1.

The applicant is cognizant of the fact that a wheelhousing of the type described here could be constructed with the inner liner, here composed of panels 9 and 10, of one piece with no seam as shown and indicated by reference 12. However, the applicants' invention is not directed to that detail of construction, and it is contemplated that the instant invention can be utilized whenever the outer panel of the wheelhousing is an integral part of the quarter panel of the body and whenever a liner is provided for said panel and wheelhousing.

As shown in Figure 2, the body flooring 13 is raised directly above the filler pipe 15 so as to form a slanting tunnel or arch for the accommodation of pipe 15. Although this method of floor construction is well-known and is not of particular concern to the instant invention, it is portrayed, however, to demonstrate the manner in which the filler pipe and gasoline tank are completely isolated from the interior of the body.

In the formation of the wheelhousing as contemplated by this application, the outer panel 7 and the inner panel 9 are formed so as to be in contact with one another where it is intended the handhole shall be located. The contours of panel 7 are not perceptibly altered, except to form a slight door recess 19. On the other hand, however, a pronounced boss 20 having outwardly convex walls substantially circular in section is formed in the panel 9; the top of the boss coinciding with the bottom of the recess 19. Both panels are then pierced at said point of contact, and the edges of the handhole formed. The edges of said hole in one panel are joined to the corresponding edges of the said hole in the second panel, said jointure being accomplished by one of the many known methods of clamping and welding combinations which will result in a fume, gasoline, and watertight seam along line 16 completely encircling the handhole opening.

Figure 3:
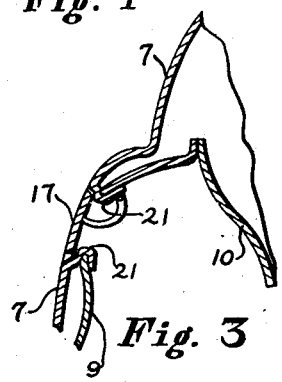
Figure 3 is an enlarged cross sectional view of the handhole area.

A possible method of construction and jointure of the two panels adjacent to the handhole is portrayed in Figure 3. Here the hole in the outer panel 7 was formed with an inwardly extending flange 21 around said hole. Said flange 21 formed to insert into the hole through the inner panel 9 and extend through said hole, is so inserted through said hole and is bent downwardly upon the edges of the hole in the inner panel, away from the center of said hole, thereby forming a leakproof seam and a secure jointure of the two panels at that point. The provision of a joint of this type completes the sealing of the wheelhousing portion of the body from the passenger and luggage spaces and prevents the entrance of fumes or moisture into the space between the panels, particularly panels 7 and 9. A hinged cover 17 of the conventional type is installed over the hole piercing the two panels.

A particular benefit is derived from the placement of the handhole through the two joined panels and the welded seam around such hole. The arch construction afforded by the outset boss 20 strongly reinforces the exterior walls of both the fender and wheelhousing, prevents "drumming" or excessive vibration between the panels, tends to preclude collapse of the structure between panels 7 and 9, and adds materially to the strength and rigidity of the entire construction. These are all obtained without adversely affecting the outer body contour.

To provide additional strength to the installation and to adequately protect the gasoline filler pipe from stones and other materials apt to be thrown upwards by the wheel 8, in the instant arrangement includes a conventional baffle plate 18 suspended between and fastened through flanges 22 to inner panels 9 and 10 in a substantially vertical position.

Some changes may be made in the arrangement, construction and combination of the various parts of the improved device without departing from the spirit of the invention, and it is the intention to cover by the claims such changes as may reasonably be included within the scope thereof.

The invention claimed is:

1. A rear fender construction for a motor vehicle body comprising an outer panel formed as a downwardly and outwardly extending part of the quarter panel of said body, a transversely arched wheelhousing disposed a substantial distance inwardly of said outer panel and extending therealong, the outer lower edge of said housing being secured to the lower edge of said outer panel, a shallow indentation formed in said outer panel, a corresponding outwardly projecting boss formed on the outer arched member of said wheelhousing, aligned apertures through said indentation and said boss, said indentation and boss being in contact around the rims of said apertures and there secured to each other, a door having a concealed hinge mounted within said boss, said door, when closed, assuming a flush position with said outer panel in said indentation.

2. A rear wheelhousing on a vehicle body comprising an outer panel formed as an integral part of, and downwardly and outwardly extending from the quarter panel of said body, an aperture through said extending panel, an inwardly projecting flange around the periphery of said aperture, an inner liner panel substantially parallel to and inside of said extending panel, said panels being joined to one another along their lower extremities, a boss formed outwardly in said inner panel, an aperture in said boss to coincide with the aperture in said extending panel and to receive said projecting flange, said flange being clamped over the edges of the aperture in said boss so as to join substantially and rigidly the two panels on a line immediately adjacent to and surrounding said aperture, an outer cover over said aperture, a second inner panel rigidly joined to the floor panel of said body and extending upwardly and outwardly therefrom, said second inner panel meeting and being rigidly joined to the upper extremity of said first inner panel so as to form with said first inner panel the inner walls of said wheelhousing and the top thereof, and a baffle plate extending between and joined to said inner panels so as to provide a rigid support for said panels.

3. In a motor vehicle body having a wheelhousing formed of an outer panel extending as an integral part of the quarter panel of said body, an inner liner to said wheelhousing comprising an inner panel joined to the lower extremity of said outer extending panel, said inner panel positioned substantially parallel to said outer extending panel and normally spaced therefrom and formed with an outwardly convex boss so as to contact said extending panel at a predetermined point and afford an arch support therefor, an aperture through said outer extending panel and said inner panel at the area of contact therebetween, the edges of said panels adjacent to said aperture joined so as to form a continuous seam around said aperture, a cover over said aperture, a second inner panel extending from the floor panel of said body to the upper extremity of said first inner panel and joined thereto, and a substantially vertical baffle plate joining and providing rigid support to and between said inner panels.

4. In a motor vehicle having a gasoline tank and a filled pipe extending from said tank, a vehicle body wheelhousing comprising an outer panel formed as an integral part of the quarter panel of said body, an inner panel positioned substantially parallel to said outer panel and joined thereto along the lower extremity of said panel and spaced inwardly therefrom a substantial distance, an outwardly convex boss formed in said inner panel to contact said outer panel, an aperture through said outer panel and said boss of said inner panel at the area of contact between said panels, so as to permit access to the gasoline tank filler pipe, said aperture being bordered by a seam formed by the autogenous jointure of said panels immediately adjacent to said aperture, a hinged cover for said aperture, a second inner panel having its lower extremity joined to the floor panel of said body and extending upwardly and outwardly therefrom so as to join at its upper extremity the first of said inner panels, thereby forming with said inner panel the top of said wheelhouse, and a substantially vertical baffle panel joining said inner panels so as to provide rigid support thereto.

5. In a vehicle body having a wheelhousing entered by a gasoline tank filler pipe, said wheelhousing comprising an outer panel formed as an extension to, and an integral part of the rear quarter panel of said body, an inner panel positioned substantially inwardly of said extending panel and substantially parallel thereto joined at its lower extremity to said outer extended panel and in contact with said outer panel through an outwardly convex boss formed in said inner panel, affording an arched support for said outer panel, an aperture to provide access to said gasoline tank filler pipe through said outer panel and said inner panel at the area where said inner panel boss contacts said outer panel, a moisture and vapor-proof seam joining said panels, said jointure positioned around the circumference of said aperture and immediately adjacent thereto, a cover for said aperture, a second inner panel extending substantially vertically from the floor panel of said vehicle body to the upper extremity of said apertured inner panel and rigidly joined thereto, and a substantially vertical baffle plate extending between said inner panels so as to maintain rigidity between the said inner panels.

LAWRENCE B. RIVARD.
HERMAN C. KROEPEL.

REFERENCES CITED

The following references are of record in the file of this patent:

UNITED STATES PATENTS

| Number | Name | Date |
|---|---|---|
| 2,073,058 | Greene | Mar. 9, 1937 |
| 2,335,058 | Haltenberger | Nov. 23, 1943 |

FOREIGN PATENTS

| Number | Country | Date |
|---|---|---|
| 550,575 | British | Jan. 14, 1943 |
| 505,160 | British | May 5, 1939 |